(12) United States Patent
Cheng et al.

(10) Patent No.: US 6,574,320 B1
(45) Date of Patent: Jun. 3, 2003

(54) COIN RELEASE MECHANISM OF PAYPHONE

(76) Inventors: Li-Der Cheng, 6F, No. 18, Lane 82, Sec. 7, Chung Shan N. Road, Taipei (TW); Yi-Rong Lee, 7F, No. 382, Hsin Feng Street, Keelung (TW)

( * ) Notice: Subject to any disclaimer, the term of this patent is extended or adjusted under 35 U.S.C. 154(b) by 254 days.

(21) Appl. No.: 09/291,828

(22) Filed: Apr. 14, 1999

(51) Int. Cl.⁷ ............................................. H04M 17/00
(52) U.S. Cl. ........................ 379/150; 379/146; 379/153; 379/155
(58) Field of Search ................................ 379/145, 146, 379/150, 153, 155; 194/345, 295

(56) References Cited

U.S. PATENT DOCUMENTS

| | | | | |
|---|---|---|---|---|
| 4,809,316 A | * | 2/1989 | McGough | 379/153 |
| 4,815,123 A | * | 3/1989 | McGough | 379/153 |
| 5,299,673 A | * | 4/1994 | Wu | 194/345 |
| 5,737,402 A | * | 4/1998 | Cheng et al. | 379/150 |

* cited by examiner

Primary Examiner—Curtis Kuntz
Assistant Examiner—Quoc Tran

(57) ABSTRACT

A payphone coin release device includes a base plate fixed inside the payphone casing and having a pivotal pin extending therefrom to rotatably support thereon a driven link having two opposite arms of which one is rotatably pivoted at one end of an intermediate link and the other one rotatably supports thereon a coin release roller to cooperate with a conventional coin receiving device. The base plate also has a hole through which a shaft rotatably extends to drivingly engage a driving link. The driving link has a pin formed thereon to drivingly engage an intermediate link. The intermediate link is pivoted at two opposite ends to both the driven link and the driving link. The shaft of the driving link extends outside the payphone casing and is connected to a user-actuateable lever so that by actuating the lever, the driving link is rotated to drive, through the connection of the intermediate link, the driven link to rotate about the pivot. The driving link has higher and lower extensions to work with a stop provided on the base plate to limit the rotation of the driving link. A biasing spring is provided between the driving link and the base plate to bias the driving link toward an un-actuated position defined by contact engagement between the lower extension of the driving link and the stop on the base plate.

4 Claims, 2 Drawing Sheets

COIN RELEASE MECHANISM OF PAYPHONE

FIELD OF THE INVENTION

The present invention relates generally to a coin release device, in particular to a simplified and improved coin release device to be used in a payphone.

BACKGROUND OF THE INVENTION

Payphones are operable by receiving coins deposited therein. Such payphone is usually equipped with a coin release device arranged inside the casing of the phone and in mechanically coupling with a coin release lever which is located outside the phone casing and accessible by phone users.

A prior art coin release device includes a base plate, a driving link, a driven link and a biasing spring. The base plate is fixed inside the payphone casing and has a pivot pin extending therefrom to be rotatably supported by the driven link having two opposite arms. One arm has a pin formed thereon and the other one rotatably supports a coin release roller adapted to be cooperated with a coin receiving device. The driving link has an elongated slot into which the pin of the driven link extends and drivingly engages. The shaft of the driving link extends outside the payphone casing and is connected to a user-actuateable lever so that by actuating the lever, the driving link is rotated to drive, through the connection between the elongated slot and the pin, the driven link may rotate about the pivot. A biasing spring is provided between the driving link and the base plate to bias the driving link toward an un-actuated position defined by contact engagement between an extension of the driving link and a stop provided on the base plate.

Although the current technology is more simplified and practical when compared with conventional arts, it still suffers from several drawbacks described as follows:

1. An elongated slot is designed at one end of the driving link to intentionally drive the pivot pin located on the driven link. Such elongated slot requires complicated manufacture process and thus induces additional cost.
2. The lateral dimension of the elongated slot requires high accuracy to guarantee a linear motion of the corresponding pivot pin along the longitudinal direction of the elongated slot; otherwise, the user-actuateable lever will have to be tilted to be able to start actuating and therefore impair the product quality.
3. The return stroke of the driving link is ended by the contact between the extension of the driving link and the stop on the base plate. However, there's no device provided to limit the motion of the driving link in the forward stroke, thus increase the damage potential if the lever is over turned.

Based on the findings of the aforementioned drawbacks, it is therefore desirable to introduce a more simplified and precise structure to reduce the cost in manufacturing and enhance the quality of the coin release device.

SUMMARY OF THE INVENTION

An object of the present invention is to provide a payphone coin release device, which has a pivotal intermediate link to transmit the force from the driving link to the driven link, to function more precisely when compared with the conventional structure.

Another object of the present invention is to provide a payphone coin release device that could avoid the oscillation of the pivot pin to enhance its quality.

Yet a further object of the present invention is to provide a payphone coin release device that has a driving link with two extensions, which could limit the strokes of the driving link to avoid the damage of the device if one over turns the user-actuateable lever.

To achieve the aforementioned objects, there is provided a payphone coin release device comprising a base plate fixed inside the payphone casing and, having a pivotal pin extending therefrom to rotatably support thereon a driven link having two opposite arms of which one is rotatably pivoted at one end of an intermediate link and the other one rotatably supports thereon a coin release roller to cooperate with a conventional coin receiving device. The base plate also has a hole through which a shaft rotatably extends to drivingly engage a driving link. The driving link has an pin formed thereon to drivingly engage an intermediate link. The intermediate link is pivoted at two opposite ends to both the driven link and the driving link. The shaft of the driving link extends outside the payphone casing and is connected to an user-actuateable lever so that by actuating the lever, the driving link is rotated to drive, through the connection of the intermediate link, the driven link to rotate about the pivot. The driving link has higher and lower extensions to work with a stop provided on the base plate to limit the rotation of the driving link. A biasing spring is provided between the driving link and the base plate to bias the driving link toward an un-actuated position defined by contact engagement between the lower extension of the driving link and the stop on the base plate.

These and other objects and advantages of the present invention will become more apparent from a consideration of the following detailed description of a preferred embodiment thereof, when read in conjunction with the accompanying drawings, wherein:

DETAILED DESCRIPTION OF THE PREFERRED EMBODIMENT

Figure 1:
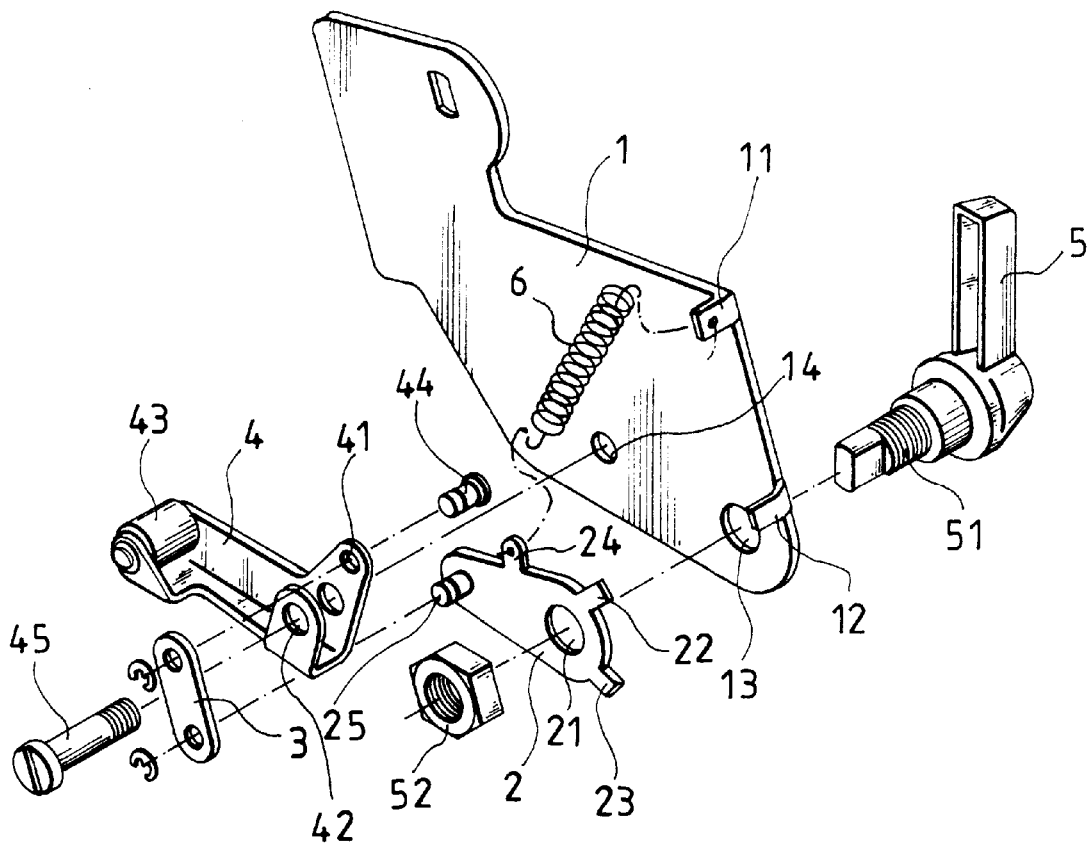
FIG. 1 is an exploded perspective view showing a coin release device for being used in a payphone constructed in accordance with the present invention.
Figure 2:
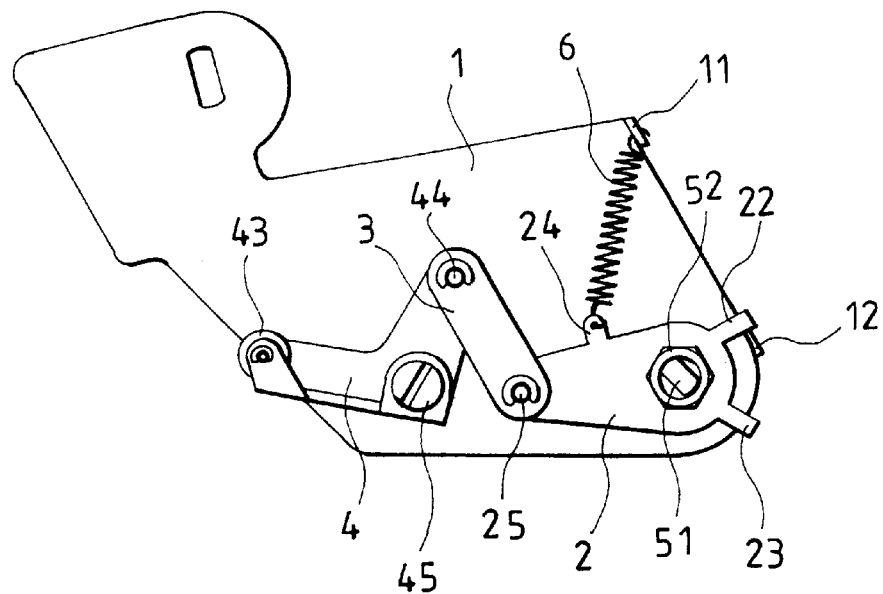
FIG. 2 is a side view of the coin release device of FIG. 1 at its rest state.
Figure 3:
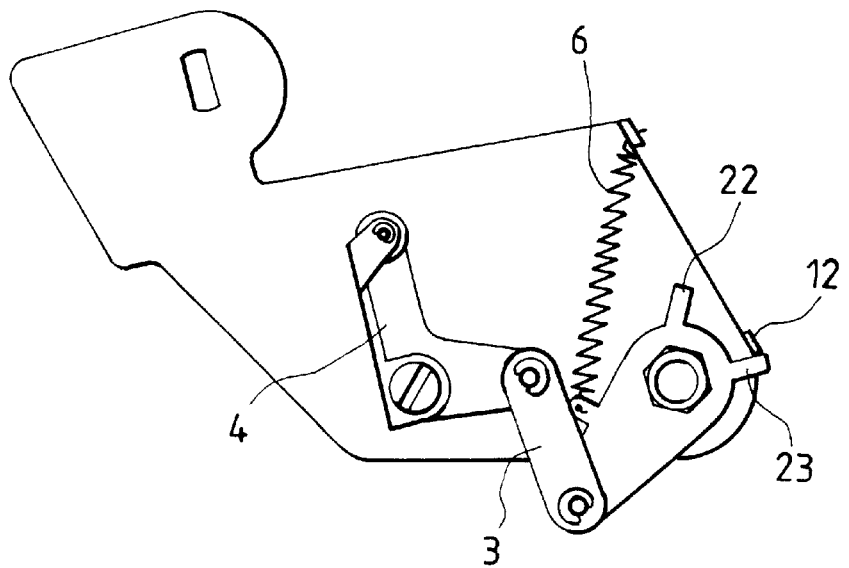
FIG. 3 is another side view of the coin release device of FIG. 1 at the state that forward stroke is ended.

Referring to FIGS. 1 and 2, a coin release device constructed in accordance with the present invention is shown. Based on the present invention, the coin release device comprises a base plate 1, which has an extension 11 and a stop block 12. A driving link 2 is rotatably supported on the base plate 1 by means of a pivot shaft 51 coupled to and driven by a coin release lever 5 so that the pivot shaft 51 can rotate in unison therewith.

Extending through a hole 13 on the base plate 1, the pivotal shaft 51 is rotatably received and supported within the hole 13. The pivotal shaft 51 also extends through a hole 21 on the driving link 2 to engage the driving link 2. Furthermore, the shaft 51 is threaded on the inner end thereof so that a screw nut 52 can be used to secure the driving link 2 on the shaft 51 and the driving engagement therebetween.

In the embodiment illustrated, the stop 12 is positioned between an upper extension 22 and a lower extension 23 on the base plate 1, which serve as constraints of the movement of the driving link 2. There is also an elastic element 6 with one end fixed to the extension 11 and the other end fixed to another extension 24 on the driving link 2. The elastic element 6 is applied to maintain the driving link 2 in the un-actuated position once the lever 5 is not actuated.

The coin release device also comprises an intermediate link 3 two ends of which are rotatably coupled to the driving link 2 and a driven link 4, respectively. On the two ends of the intermediate link 3, there are two holes in correspondence with a shaft 25 extending from the driving link 2 and a hole 41 on the driven link 4, respectively. The pivot shaft 25 rotatably supports the intermediate link 3 by extending through the hole on one end thereof. A fixing ring is used to prevent the intermediate link 3 from being separated with the shaft 25. Similarly, a shaft 44 rotatably supports the intermediate link 3 by extending through the hole on the other end thereof and the hole 41. A fixing ring is also used to prevent parts from being separated with the shaft 44.

The driven link 4 has a hole 42 through which a pivotal shaft 45 extends. Preferably, the shaft 45 is threaded on one end, to engage with a threaded bore 14 on the base plate 1 to rotatably support the driven link 4 thereon. Preferably, the pivot 45 also has an expanded end opposite to the threaded end to maintain the driven link 4 on the pivotal shaft 45. Finally, the driven link 4 rotatably supports a roller 43 on the end opposite to the holes 41 and 42. In cooperation with a coin receiving device known to the art, when the driving link 2 is actuated with the coin release lever 5, the driven link 4 is driven to move the roller and to perform the coin release operation.

In accordance with the present invention, when the coin release device is deployed in a pay phone, the base plate 1 is appropriately fixed inside the casing of the pay phone. The driven link 4 is preset in the position to actuate the coin receiving device. The coin release lever 5 is located outside the pay phone casing and is accessible to users. Extending through the casing, the shaft 51 is coupled to the driving link 2. When the lever 5 and the driving link 2 are actuated, the driven link 4 is driven by means of the intermediate link 3 so that the roller 43 is also driven to perform the coin release operation. When the lever 5 is released, the driving link 2 is pulled back to the un-actuated position by the elastic element 6. Consequently, the driven link 4 is also driven back to the initial position by means of the intermediate link 3. Furthermore, the extensions 22 and 23 define the un-actuated and the fully-actuated positions. Once the lever 5 is actuated and released, the driving link is stopped by the engagement between the extensions 22 and 23 thereof and the stop 12 on the base plate 1. Therefore, the strokes of the driving link 2 are constrained so as to avoid damage if user over turns the lever 5.

Although the preferred embodiment has been described to illustrate the present invention, it is apparent that changes and modifications in the specifically described embodiment can be carried out without departing from the scope of the present invention. Such modifications and changes should be considered within the scope of the present invention which is intended to be limited only by the appended claims.

What is claimed is:

1. A coin release device comprising:

a base plate including an extension and a stop formed thereon, and a hole through which a pivotal shaft extends to couple to a user-accessible lever;

a driving link which is secured on an inner end of said pivotal shaft, said driving link further comprising two extended parts to define a working range of said driving link in cooperation with said stop on said base plate;

a driven link which is rotatably supported on said base plate by a pivotal rod extending through a hole on said driven link and engaging with said base plate;

an intermediate link having one end with a first hole coupled to a first shaft extended from said driving link and the other end with a second hole coupled to a second shaft extending through a hole on said driven link; and an elastic element linking between said base plate and said driving link.

2. The coin release device as claimed in claim 1, wherein said pivotal shaft extends through said hole on said base plate and a hole on said driving link to engage with said driving link, said pivotal shaft further includes a threaded end so that a screw nut is used to secure the driving engagement between said pivotal shaft and said driving link.

3. The coin release device as claimed in claim 1, wherein said intermediate link engages with said driving link and said driven link so that when said driving link is actuated with said user-accessible lever, said driven link is driven correspondingly.

4. The coin release device as claimed in claim 1, wherein said elastic element has one end fixed to said driving link and the other end fixed to said base plate so that when said user-accessible lever is released, said elastic element pulls said driving link back to an un-actuated position.

* * * * *